United States Patent
Sui

(10) Patent No.: US 8,953,940 B2
(45) Date of Patent: Feb. 10, 2015

(54) METHOD, APPARATUS, AND SYSTEM FOR TIME SYNCHRONIZATION ON PASSIVE OPTICAL NETWORK

(75) Inventor: Meng Sui, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 105 days.

(21) Appl. No.: 13/554,360

(22) Filed: Jul. 20, 2012

(65) Prior Publication Data

US 2012/0288280 A1 Nov. 15, 2012

Related U.S. Application Data

(63) Continuation of application No. PCT/CN2010/080426, filed on Dec. 29, 2010.

(30) Foreign Application Priority Data

Jan. 22, 2010 (CN) .......................... 2010 1 0103233

(51) Int. Cl.
*H04J 14/08* (2006.01)
*H04J 14/00* (2006.01)
(Continued)

(52) U.S. Cl.
CPC .......... *H04Q 11/0067* (2013.01); *H04J 3/0655* (2013.01); *H04J 14/0282* (2013.01); *H04J 3/0682* (2013.01); *H04Q 2011/0079* (2013.01);
(Continued)

(58) Field of Classification Search
CPC ............... H04B 10/27; H04Q 11/0067; H04Q 2011/0096
USPC ............................... 398/66, 70, 43
See application file for complete search history.

(56) References Cited

U.S. PATENT DOCUMENTS 6,094,464 A * 7/2000 Ebringer et al. ............... 375/342
7,301,968 B2 * 11/2007 Haran et al. ................... 370/508
(Continued)

FOREIGN PATENT DOCUMENTS

CN 101039159 9/2007
CN 101039159 A 9/2007
(Continued)

OTHER PUBLICATIONS

Effenberger [Telecommunication Standardization Sector, Study Group 15—Contribution 133].*
(Continued)

*Primary Examiner* — Oommen Jacob
(74) *Attorney, Agent, or Firm* — Staas & Halsey LLP

(57) ABSTRACT

A method for time synchronization on a passive optical network is disclosed, including: an optical line terminal (OLT) receives clock information sent by a first optical network unit (ONU); the OLT adjusts local time of the OLT according to the clock information, to implement clock synchronization between the OLT and the first ONU; the OLT sends the clock information to a second ONU, to implement clock synchronization between the second ONU and the OLT. The OLT in an embodiment of the present invention does not need to obtain clock signals from an upper network and the clock information does not need to be transmitted in a multi-level mode over a packet network; therefore, the precision of ToD can be greatly increased.

4 Claims, 5 Drawing Sheets

(51) Int. Cl.
*H04J 3/06* (2006.01)
*H04Q 11/00* (2006.01)
*H04J 14/02* (2006.01)

(52) U.S. Cl.
CPC .......... *H04J 14/0247* (2013.01); *H04J 14/0252* (2013.01)
USPC .................. 398/66; 398/70; 398/43; 398/58; 398/72; 398/17

(56) References Cited

U.S. PATENT DOCUMENTS

| | | | | |
|---|---|---|---|---|
| 8,243,869 | B2* | 8/2012 | Dvir et al. | 375/376 |
| 2002/0171895 | A1* | 11/2002 | Chang | 359/168 |
| 2003/0039272 | A1* | 2/2003 | Dudziak et al. | 370/503 |
| 2007/0003282 | A1 | 1/2007 | Boyd et al. | |
| 2007/0291777 | A1* | 12/2007 | Jamieson et al. | 370/401 |
| 2008/0050116 | A1* | 2/2008 | Nakaishi et al. | 398/43 |
| 2010/0040369 | A1 | 2/2010 | Zhao et al. | |
| 2012/0288280 | A1* | 11/2012 | Sui | 398/66 |

FOREIGN PATENT DOCUMENTS

| | | |
|---|---|---|
| CN | 101330374 A | 12/2008 |
| CN | 101431385 | 5/2009 |
| CN | 101431385 A | 5/2009 |

OTHER PUBLICATIONS

International Search Report of PCT/CN2010/080426 mailed Mar. 31, 2011.
Chinese Office Action issued May 6, 2013 in corresponding Chinese Application No. 201010103233.6.
International Search Report issued Mar. 31, 2011 in corresponding International Patent Application No. PCT/CN2010/080426.
Written Opinion of the International Searching Authority issued Mar. 31, 2011 in corresponding International Patent Application No. PCT/CN2010/080426.
Wei Guo et al., "Clock synchronization of E1 over EPON", Study of Optical Communications, No. 134, 2006, 4 pages.
"IEEE Standard for a Precision Clock Synchronization Protocol for Network Measurement and Control Systems", IEEE Std. 1588™, Nov. 2002, pp. i-vii, 1-144.
"Series G: Transmission Systems and Media, Digital Systems and Networks: Very high speed digital subscriber line transceivers 2 (VDSL2)", ITU-T G.993.2, Feb. 2006, pp. i-v, 1-241.
"Series G: Transmission Systems and Media, Digital Systems and Networks: Very high speed digital subscriber line transceivers 2 (VDSL2) Corrigendum 1", ITU-T G.993.2, Dec. 2006, pp. i-iii, 1-16.
"Series G: Transmission Systems and Media, Digital Systems and Networks: Very high speed digital subscriber line transceivers 2 (VDSL2) Amendment 1", ITU-T G.993.2, Apr. 2007, pp. i-iv, 1-92.
"Series G: Transmission Systems and Media, Digital Systems and Networks: Very high speed digital subscriber line transceivers 2 (VDSL2) Corrigendum 2", ITU-T G.993.2, Jul. 2007, 4 pages.
"Series G: Transmission Systems and Media, Digital Systems and Networks: Very high speed digital subscriber line transceivers 2 (VDSL2) Amendment 2", ITU-T G.993.2, Feb. 2008, pp. 1-24.
"Series G: Transmission Systems and Media, Digital Systems and Networks: Very high speed digital subscriber line transceivers 2 (VDSL2) Amendment 3", ITU-T G.993.2, Aug. 2008, pp. i-iii, 1-79.
"Series G: Transmission Systems and Media, Digital Systems and Networks: Very high speed digital subscriber line transceivers 2 (VDSL2) Amendment 4", ITU-T G.993.2, Jan. 2009, 3 pages.
"Series G: Transmission Systems and Media, Digital Systems and Networks: Very high speed digital subscriber line transceivers 2 (VDSL2) Corrigendum 3", ITU-T G.993.2, Jun. 2009, pp. i-iii, 1-4.
Extended European Search Report issued Jul. 12, 2013 in corresponding European Application No. 10843767.4.
Frank Effenberger et al., "Proposal to support Phase Synchronization in GPON System", International Telecommunication Union, COM15-C133-E, vol. 2/15, Nov. 2008, pp. 1-3.
Frank Effenberger et al., "Draft Text for G.984.1 Revised", International Telecommunication Union, Meeting date Feb. 11-22, 2007, Revised Dec. 31, 2007, vol. Q2/15, pp. 1-34.
Chinese Office Action dated Jun. 30, 2014 in corresponding Chinese Patent Application No. 201010103233.6 (6 pages).
Chinese Search Report dated Jun. 19, 2014 in corresponding Chinese Patent Application No. 201010103233.6 (2 pages).

* cited by examiner

METHOD, APPARATUS, AND SYSTEM FOR TIME SYNCHRONIZATION ON PASSIVE OPTICAL NETWORK

CROSS-REFERENCE TO RELATED APPLICATIONS

This application is a continuation of International Application No. PCT/CN2010/080426, filed on Dec. 29, 2010, which claims priority to Chinese Patent Application No. 201010103233.6, filed on Jan. 22, 2010, both of which are hereby incorporated by reference in their entireties.

FIELD OF THE INVENTION

The present invention relates to the field of the communications technologies, and in particular, to a method, a system, and an apparatus for time synchronization on a passive optical network.

BACKGROUND OF THE INVENTION

The passive optical network (PON) technology is a point to multi-point optical access technology. As shown in FIG. 1, a PON network is generally formed by an optical line terminal (OLT) 12, an optical splitter 14, an optical network unit (ONU) 16, and optical fibers connecting those devices. As a central office end device, an OLT connects to an optical splitter over a backbone optical fiber. The optical splitter connects to each ONU over an independent branch optical fiber. In a downstream direction, the optical splitter splits light, and sends downstream optical signals of the OLT 12 to all ONU 16s through branch optical fibers. In an upstream direction, the optical splitter 14 converges optical signals, converges the optical signals sent from ONU 16s, and sends the converged optical signals to OLT 12 through the backbone optical fiber.

To ensure that optical signals from each ONU reach the OLT at the same time, a ToD (Time of Day, Time of Day) transmission scheme is generally adopted for the existing PON. As shown in FIG. 2, the OLT 12 obtains the ToD from a certain time source 24 of a core network 22 (using a certain time synchronization mechanism of a packet network, for example, 1588v2). Then, the ONU 16 obtains the ToD from the OLT 12 to synchronize the time of the ONU 16. The inventor finds that in practical application, several ONUs on certain PONs have their respective high-precision time sources. If an OLT still obtains a ToD from a certain time source of the core network, multi-level transmission over a packet network is required. As a result, the precision of the ToD decreases.

SUMMARY OF THE INVENTION

The present invention provides a method, an apparatus, and a system for time synchronization on a passive optical network. The method, apparatus, and system support high synchronization precision and save network resources.

Technical solutions of the present invention:

A method for time synchronization on a passive optical network, including the following steps:

receiving, by an optical line terminal (OLT), clock information from a first optical network unit (ONU);

adjusting, by the OLT, local time of the OLT according to the clock information to implement clock synchronization between the OLT and the first ONU;

sending, by the OLT, the clock information to a second optical network unit, to implement clock synchronization between the second ONU and the OLT.

An optical line terminal (OLT), including:

a receiving unit, configured to receive clock information from a first optical network unit (ONU);

a clock adjusting unit, configured to adjust local time of an OLT according to the clock information, to implement clock synchronization between the OLT and the first ONU;

a sending unit, configured to send the clock information to a second ONU, to implement clock synchronization between the second ONU and the OLT.

A passive optical network system, including:

an optical network unit (ONU), configured to provide clock information and send the clock information to an optical line terminal (OLT);

the OLT, configured to receive the clock information from a first ONU and adjust local time of the OLT according to the clock information, to implement clock synchronization between the OLT and the first ONU.

Benefits provided by the present invention is: An OLT in an embodiment of the present invention obtains clock information from an ONU on a PON network; the OLT transmits the clock information to other ONUs; the OLT does not need to obtain clock signals from an upper network, and the clock information does not need to be transmitted in a multi-level mode over a packet network, so that precision of a ToD can be greatly increase, the clock information of several ONUs in a system can be fully used by the OLT, and meanwhile bandwidth resources of a upstream interface of the OLT can be saved.

BRIEF DESCRIPTION OF THE DRAWINGS

To make technical solutions of embodiments of the present invention clearer, the following outlines the accompanying drawings for describing the embodiments of the present invention.

DETAILED DESCRIPTION OF THE EMBODIMENTS

To make the purposes, technical solutions, and advantages of the present invention clearer, the technical solutions of embodiments of the present invention are illustrated in detail with reference to the accompanying drawing and the embodiments of the present invention.

Figure 1:
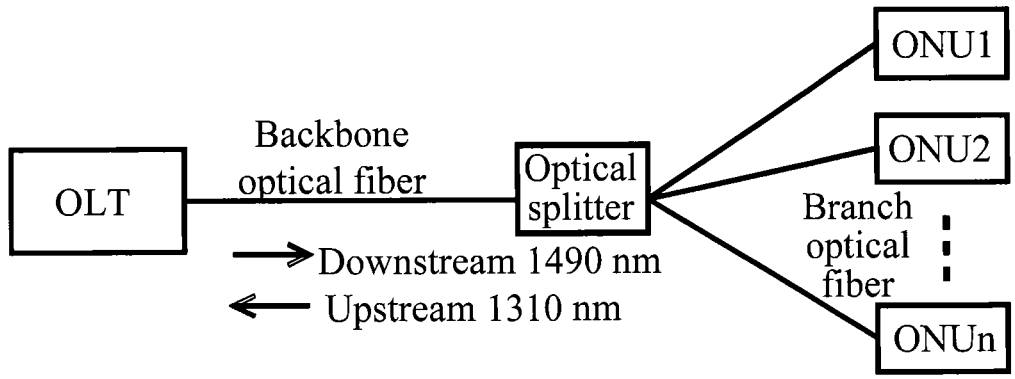
FIG. 1 is an architecture schematic diagram of a PON system in the prior art.
Figure 2:
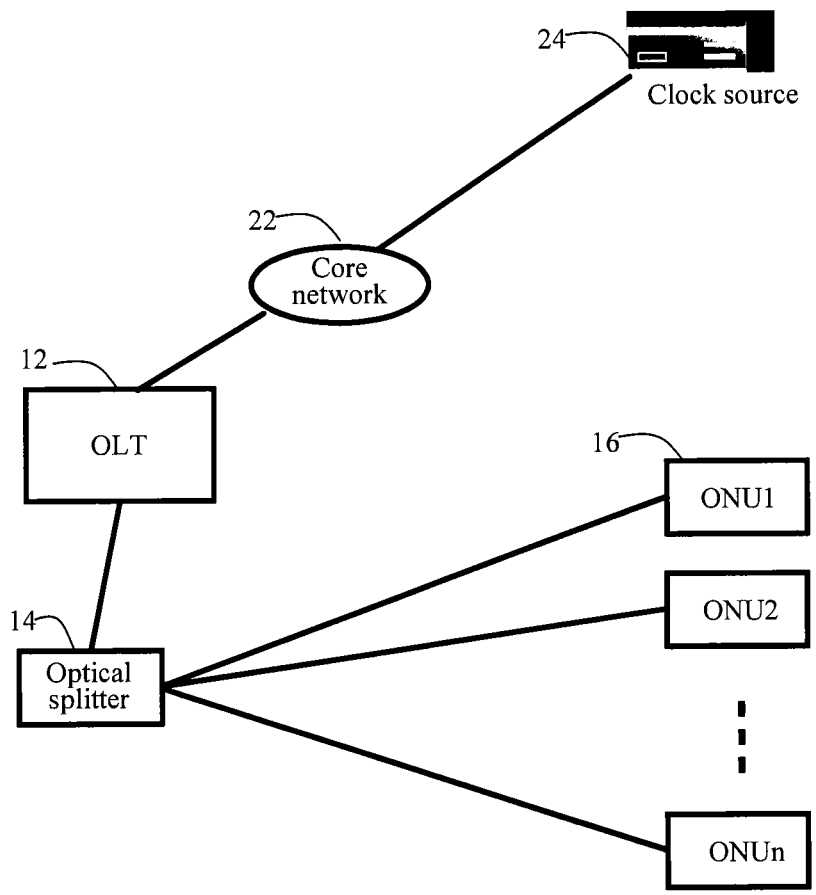
FIG. 2 is a schematic diagram of an embodiment in the prior art.
Figure 3:
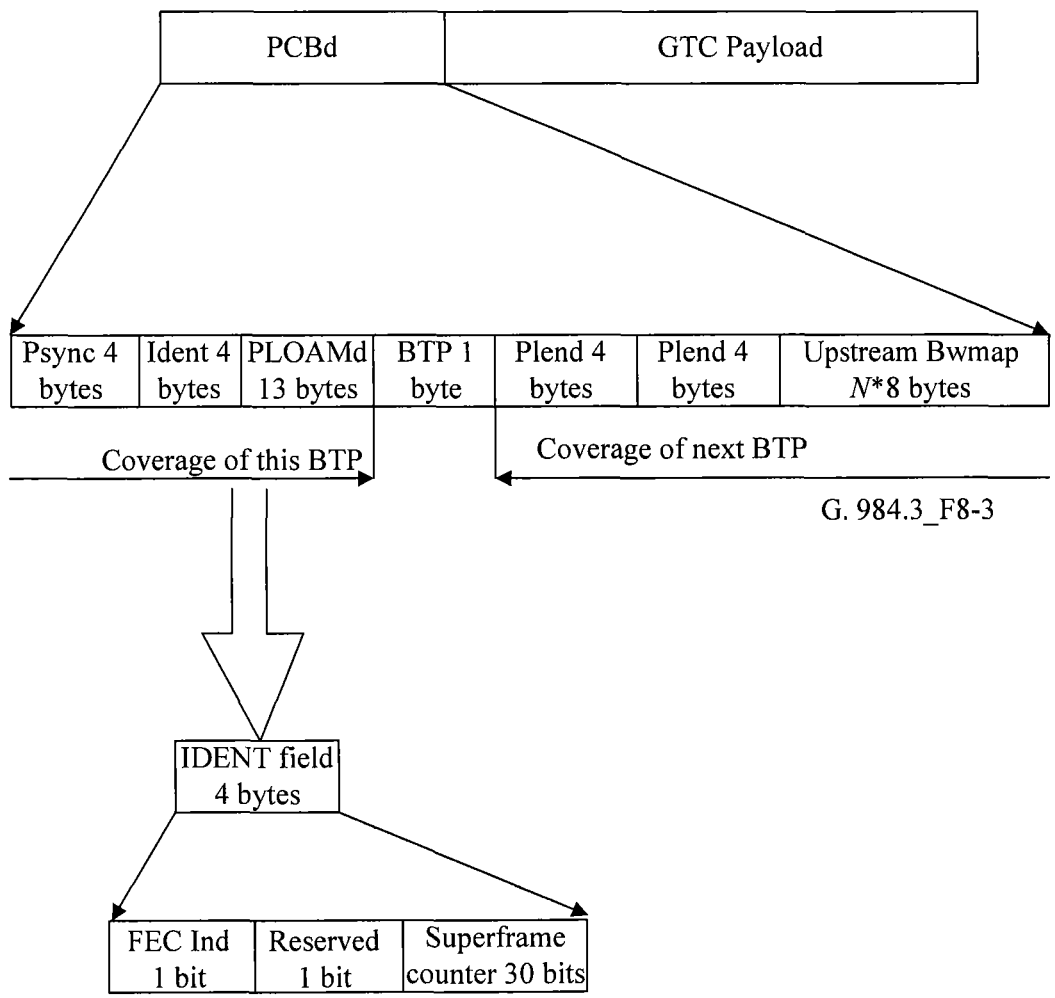
FIG. 3 is a structural schematic diagram of a frame according to Embodiment 1 of the present invention.

Embodiment 1 of the present invention uses a GPON as an example to describe the technical solutions of the present invention. As shown in FIG. 3, FIG. 3 is a structural schematic diagram of a frame according to Embodiment 1 of the present invention. An Ident field in a downstream frame header PCBd of the GPON has 32 bits, among which 30 bits are used as a counter. A count value of an Ident in a frame is 1 larger than that in a previous frame. When the counter reaches a maximum value, a count value of an Ident in a next frame is set to 0. In the GPON, a downstream frame as shown in FIG. 3 is sent every 125 μs, and a counter field in the Ident field of the downstream frame automatically increases by 1 every time when a downstream frame is sent. If the time when a certain downstream frame x1 reaches a specific ONU is time T1 (generally, the time is measured by an ONU using hardware to ensure precision), the time when any frame x2 reaches the ONU can be learned: T2=T1+(X2−X1)×125 μs.

The time T2 subtracts a transmission delay Td that is from an OLT to an ONU (a downstream transmission delay may be measured by using an existing ranging mechanism of the GPON), and then sending time Ts2 of sending any frame X2 by the OLT can be obtained.

Figure 4:
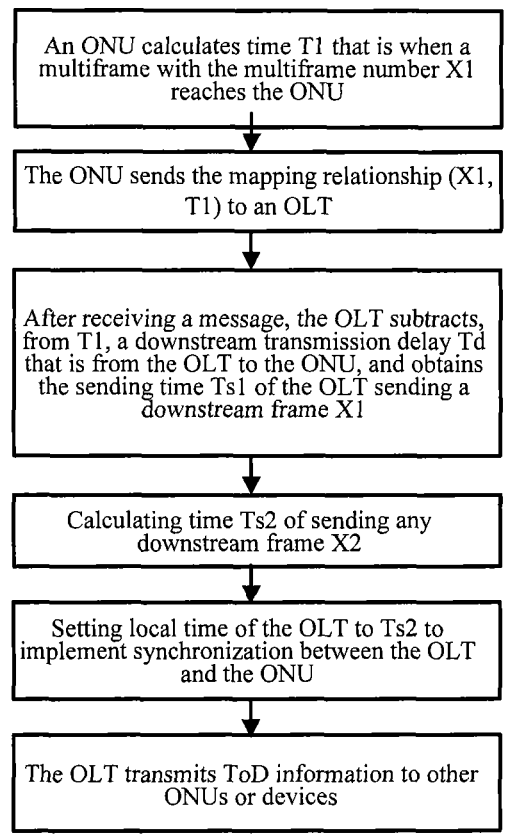
FIG. 4 is a flowchart of Embodiment 1 of the present invention.
Figure 5:
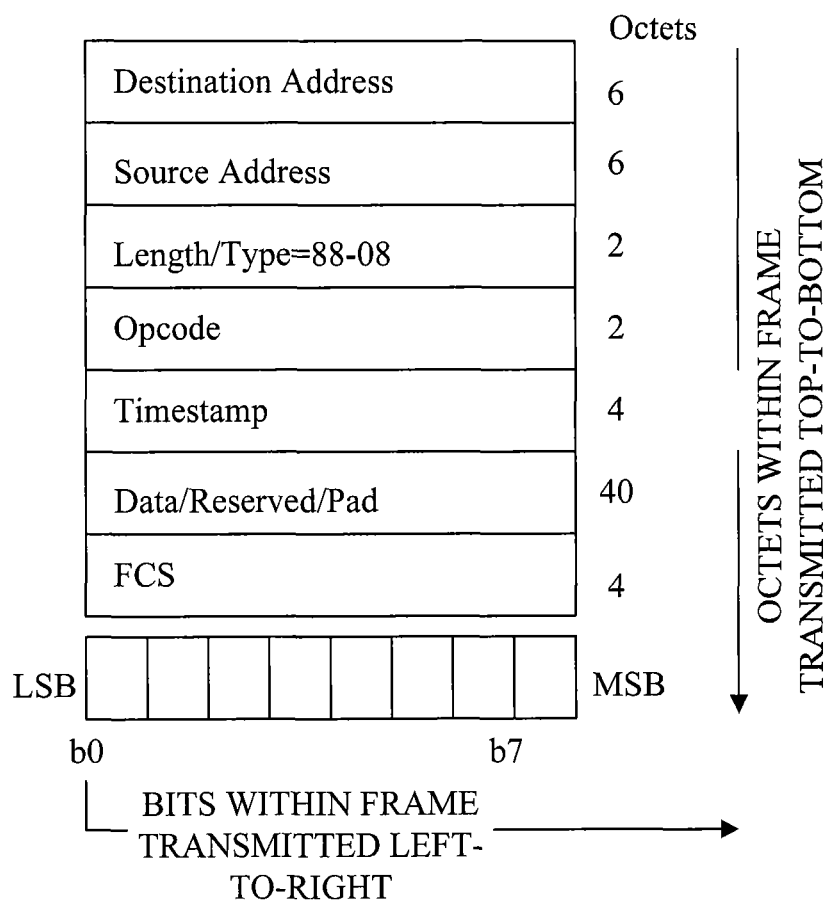
FIG. 5 is a structural schematic diagram of a frame according to Embodiment 2 of the present invention.

Therefore, the method of obtaining a ToD by an OLT from an ONU is as follows:

Through an OMCI message, a PLOAM message, or a data package, the ONU notifies in advance the OLT of the time when a certain downstream frame reaches the ONU. The message carries a super frame number and a ToD, and then the OLT can obtain, according to the preceding formula, ToD information of sending any frame, so as to complete time synchronization with the ONU. As shown in FIG. 4, specific steps are as follows:

Step 1: The ONU calculates time T1 that is when a multiframe with the multiframe number X1 reaches the ONU.

Step 2: The ONU sends the mapping relationship (Xl, T1) to the OLT through an OMCI message (or a PLOAM message or a data packet).

Step 3: After receiving the message, the OLT subtracts the downstream transmission delay Td that is from the OLT to the ONU from T1, to obtain the sending time Ts1 of the OLT sending a downstream frame X1.

Step 4: If time synchronization is required, the sending time Ts2 of sending any downstream frame X2 is calculated: Ts2=Ts1+(X2−X1)×125 μs.

Step 5: When a downstream frame X2 is sent, local time of the OLT is set to Ts2 to implement synchronization between the OLT and the ONU; or the difference between the local time of the OLT and the ONU is calculated, and the local time of the OLT is adjusted according to the difference, to implement synchronization between the OLT and the ONU.

Step 6: After the OLT synchronizes the time with that of the ONU, the OLT can transmit the ToD information to other ONUs or transmit the information to other devices.

In step 3 of the embodiment, after the OLT receives the message, the OLT subtracts the downstream transmission delay Td from T1 to obtain the sending time Ts1 of the OLT sending the downstream frame X1; it can be understood that: according to requirements, persons of ordinary skill in the art can enable the ONU to subtract Td before step 2.

Embodiment 2 of the present invention uses an EPON as an example to describe the technical solutions of the present invention. As shown in FIG. 4, an OLT and ONU of the EPON each have a 32-bit local time stamp. When the time stamp increases by 1, it indicates that 16 nanoseconds pass. The time stamp is used to fill in a Timestamp field of an MPCP packet and is used for dynamic bandwidth allocation. Timestamp is directly mapped from the local time stamp of the OLT when the OLT sends a MPCP packet. When the ONU receives a corresponding MPCP packet, the ONU may set the local time stamp of the ONU to a value of the Timestamp field in the corresponding MPCP packet. Before the ONU receives a next MPCP packet, the ONU accumulates the value of the time stamp correspondingly through natural oscillation of a local clock, to keep the time stamp synchronized with a corresponding time stamp of the OLT.

With the mechanism, the difference between the time stamp of the ONU and the time stamp of the OLT constantly remains to be RTT/2 (to be more accurate, Td, the downstream transmission delay). If a ToD corresponding to a time stamp at an ONU side is learned, a ToD corresponding to an OLT can be calculated through the type of relationship, so as to implement time synchronization between the OLT and the ONU.

Similar to the time synchronization method of the GPON, the method of time synchronization on the EPON is as follows:

The ONU notifies the OLT of ToD information corresponding to a certain time stamp through an extended OAM message, an MPCP message, or a data packet. The content of the message includes a Timestamp and a ToD, and then the ONU can synchronize the time with that of the OLT according to the preceding relationship.

Figure 6:
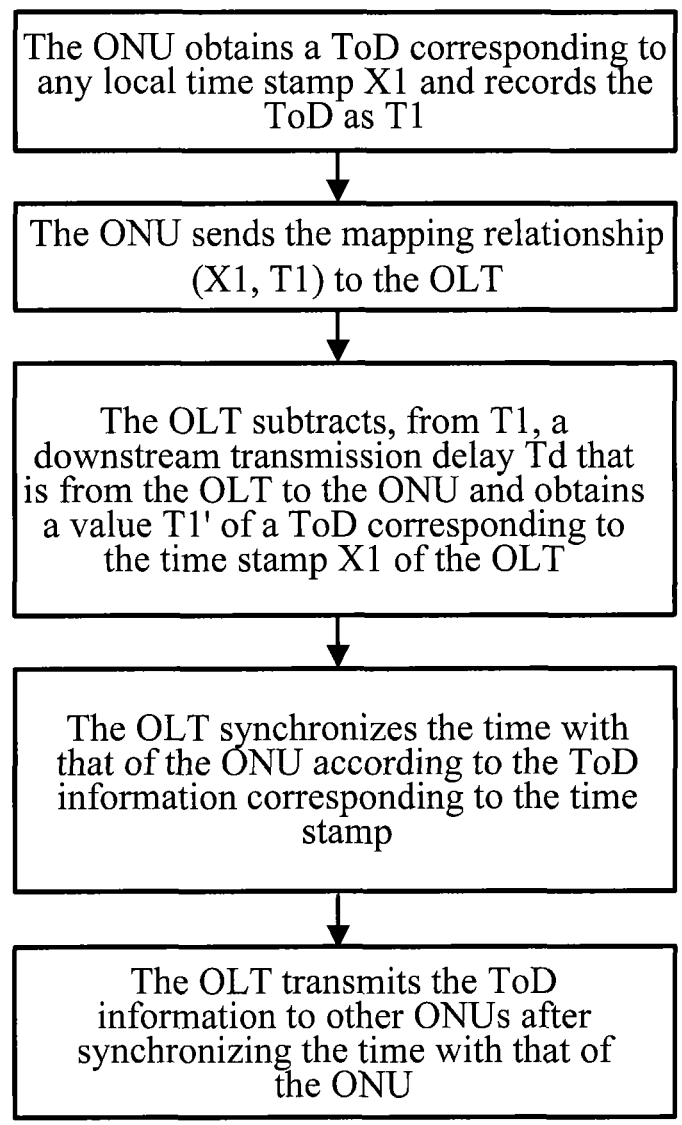
FIG. 6 is a flowchart of Embodiment 2 of the present invention.

As shown in FIG. 6, specific steps of the embodiment are as follows:

Step 1: The ONU obtains a ToD corresponding to any local time stamp X1, and records the ToD as T1.

Step 2: The ONU sends the mapping relationship (X1, T1) to the OLT through an extended OAM message (or an MPCP message or a data packet).

Step 3: After receiving the message, the OLT subtracts the downstream transmission delay Td that is from the OLT to the ONU from T1, to obtain a value T1' of a ToD corresponding to the time stamp X1 of the OLT.

Step 4: The OLT synchronizes the time with that of the ONU according to ToD information that corresponds to the time stamp of the OLT.

Step 5: After the OLT synchronizes the time with that of the ONU, the OLT can transmit the ToD information to other ONUs or transmit the information to other devices.

In the embodiment of the present invention, an OLT obtains clock information from an ONU on a PON network, the OLT transmits the clock information to other ONUs, the OLT does not need to obtain clock signals from an upper network, and the clock information does not need to be transmitted in a multi-level mode over a packet network, so that precision of a ToD can be greatly increased, the clock information of several ONUs in a system can be fully used by an OLT, and meanwhile bandwidth resources of a upstream interface of the OLT can be saved.

The above describes exemplary embodiments of the present invention, and during specific implementation process, persons skilled in the art can make various modifications and variations to the technical solutions of the present invention according to requirements in specific scenarios. Therefore, the exemplary embodiments of the present invention are merely illustrative, but not intended to limit the protection scope of the present invention.

The invention claimed is:

1. A method for time synchronization on a passive optical network, comprising:
    receiving, by an optical line terminal (OLT), clock information sent by a first optical network unit (ONU);
    adjusting, by the OLT, local time of the optical line terminal according to the clock information, to implement clock synchronization between the OLT and the first ONU;
    sending, by the OLT, the clock information to a second ONU, to implement clock synchronization between the second ONU and the OLT;

wherein:
   the clock information comprises a mapping relationship (X1, T1), wherein T1 is a timestamp when a multiframe with a multiframe number X1 reaches the first ONU;
   the adjusting, by the OLT, the local time of the OLT according to the clock information, to implement the clock synchronization between the OLT and the first ONU comprising:
      after receiving, by the OLT, the mapping relationship (X1, T1), subtracting a downstream transmission delay Td that is from the OLT to the first ONU from T1, and obtaining sending time Ts1 of the OLT sending a downstream frame X1;
      calculating time of sending any downstream frame X2 according to Ts2=Ts1+(X2−X1)×125 μs; and
      when sending the downstream frame X2, setting the local time of the OLT to the calculated Ts2 to implement synchronization between the OLT and the first ONU; or
wherein
   the clock information comprises a mapping relationship (X3, T3), wherein T3 is a timestamp when a multiframe with a multiframe number X3 reaches the first ONU;
   the adjusting, by the OLT, the local time of the OLT according to the clock information to implement the clock synchronization between the OLT and the first ONU comprising:
      after receiving, by the OLT, the mapping relationship (X3, T3), subtracting, from T3, a downstream transmission delay Td that is from the OLT to the first ONU, and obtaining a value T1' of a Time of Day (ToD) corresponding to the time stamp T3 of the OLT; and
      implementing, by the OLT clock synchronization between the OLT and the first ONU according to ToD information corresponding to the time stamp T3 of the OLT.

2. The method according to claim 1, wherein the clock information sent by the first ONU is comprised in an optical network terminal management and control interface (OMCI) message, or a physical layer operation administration and maintenance (PLOAM) message, or a data packet, and the message further comprises: a super frame number and a time of date ToD.

3. An optical line terminal (OLT), comprising:
   a receiving unit, configured to receive clock information sent by a first optical network unit (ONU);
   a clock adjusting unit, configured to adjust local time of the OLT according to the clock information, to implement clock synchronization between the OLT and the first ONU;
   a sending unit, configured to send the clock information to a second ONU, to implement clock synchronization between the second ONU and the OLT;
wherein:
   the clock information comprises a mapping relationship (X1, T1), wherein T1 is a timestamp when a multiframe with a multiframe number X1 reaches the first ONU;
   the clock adjusting unit is configured to:
      after receiving, the mapping relationship (X1, T1), subtract a downstream transmission delay Td that is from the OLT to the first ONU from T1, and obtain sending time Ts1 of the OLT sending a downstream frame X1;
      calculate time of sending any downstream frame X2 according to Ts2=Ts1+(X2−X1)×125 μs; and
      when sending the downstream frame X2, set the local time of the OLT to the calculated Ts2 to implement synchronization between the OLT and the first ONU; or
wherein
   the clock information comprises a mapping relationship (X3, T3), wherein T3 is a timestamp when a multiframe with a multiframe number X3 reaches the first ONU;
   the clock adjusting unit is configured to:
      after receiving, the mapping relationship (X3, T3), subtract, from T3, a downstream transmission delay Td that is from the OLT to the first ONU, and obtain a value T1' of a Time of Delay (ToD) corresponding to the time stamp T3 of the OLT; and
      implement, clock synchronization between the OLT and the first ONU according to ToD information corresponding to the time stamp T3 of the OLT.

4. A passive optical network system, comprising:
   an optical network unit (ONU), configured to provide clock information and send the clock information to an optical line terminal (OLT) according to claim 3;
   the OLT according to claim 3, configured to receive the clock information sent by a first ONU and adjust local time of the OLT according to the clock information, to implement clock synchronization between the OLT and the first ONU.

* * * * *